United States Patent [19]

Anderson

[11] 4,018,694
[45] Apr. 19, 1977

[54] ABSORPTION REFRIGERANT COMPOSITION

[75] Inventor: Philip P. Anderson, Newburgh, Ind.

[73] Assignee: Arkla Industries Inc., Evansville, Ind.

[22] Filed: Oct. 2, 1975

[21] Appl. No.: 619,037

[52] U.S. Cl. .................................. 252/69; 62/112; 62/476

[51] Int. Cl.² ........................................ C09K 5/04

[58] Field of Search ................ 252/69, 67; 62/112, 62/476

[56] References Cited

UNITED STATES PATENTS

| | | | |
|---|---|---|---|
| 1,791,515 | 2/1931 | Smith | 62/112 |
| 2,301,839 | 11/1942 | Work et al. | 62/112 |
| 3,296,814 | 1/1967 | Lynch et al. | 252/69 X |
| 3,388,557 | 6/1968 | Modahl et al. | 62/112 |
| 3,580,759 | 5/1971 | Albertson et al. | 62/112 X |
| 3,609,087 | 9/1971 | Chi et al. | 252/69 |

*Primary Examiner*—Harris A. Pitlick
*Attorney, Agent, or Firm*—Cushman, Darby & Cushman

[57] ABSTRACT

Solutions containing lower aliphatic alcohols, the halides of lithium, calcium, strontium and barium and water are used as absorbent-refrigerant compositions in absorption refrigeration systems.

3 Claims, 1 Drawing Figure

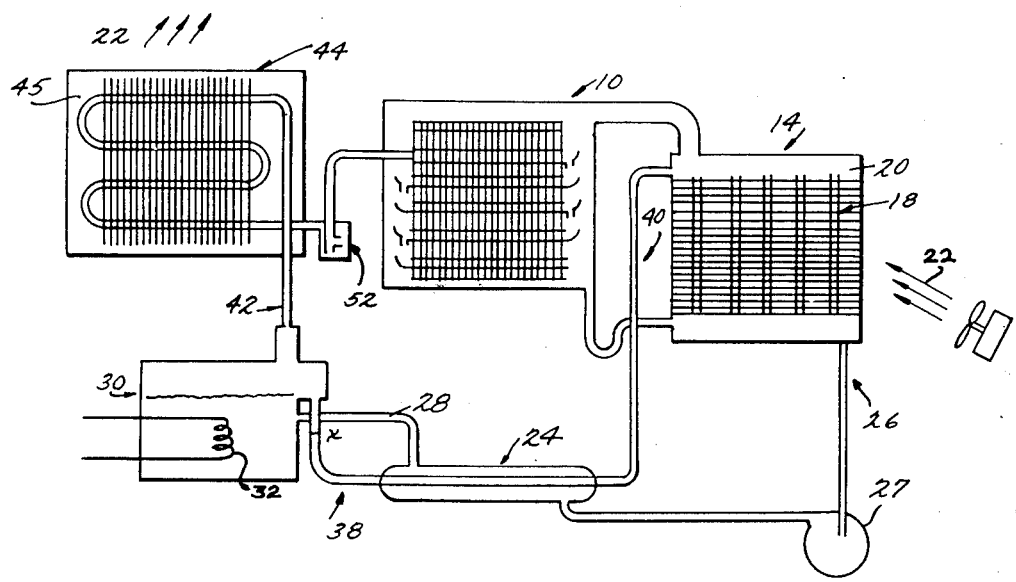

ABSORPTION REFRIGERANT COMPOSITION

This invention relates to absorption refrigeration systems and in particular to the use in such systems of novel absorbent-refrigerant compositions.

BACKGROUND OF THE INVENTION

Refrigeration systems of the general type contemplated by the present invention comprise a closed circuit containing a salt solution as the refrigerant composition. Cooling is effected by vaporizing liquid refrigerant within an evaporator coil or the like which forms part of the closed circuit. Air or other fluid medium is passed over the coil and thereby becomes chilled as it provides heat of vaporization to the refrigerant. The resulting refrigerant vapor passes to an absorber section where it is contacted with and absorbed into a stream of liquid absorbent. Heat liberated by the absorption process is removed by heat exchange with an external cooling medium. The resulting solution which has high refrigerant content passes to a generator section where it is heated by an external heat source to expel refrigerant vapor. The resulting solution which has low refrigerant content returns to the absorber section. The refrigerant vapor is condensed by heat exchange with an external cooling medium and then again passes to the evaporator section.

The operation of a typical absorption circuit depends, among other things, on the reduction of the vapor pressure of the refrigerant as it is absorbed into the absorbent. The low pressure which is produced in the absorber section is transmitted to the evaporator section and causes the liquid refrigerant to evaporate until its temperature drops to a value at which the refrigerant vapor pressure approximately equals the pressure in the absorber section. That is, the refrigerant temperature varies directly with absorber pressure. It is evident, therefore, that the cooling capacity of the circuit is directly related to absorber pressure, and for this reason it is common practice to employ an absorbent which has a low vapor pressure at the operating temperature of the absorber section.

It is recognized in the art that one way of obtaining a low absorber pressure, and thereby achieving greater cooling capacity, is to employ a more highly concentrated salt solution. On the other hand, it is also recognized that this advantage is offset by the fact that the highly concentrated salt solution has a greater tendency to crystallize, so of course the maximum concentration is limited by the solubility of the salt.

These disadvantages are aggravated in an air-cooled refrigeration system, such as an air-cooled air conditioning unit employed to cool the interior of an enclosure, for two reasons. First, a higher absorber temperature is required for a given evaporator temperature, and this in turn calls for the use of a salt solution having a particularly low vapor pressure, so low that the solubility characteristics of the commonly employed salts preclude obtaining the desired vapor pressure. Second, even if the first problem is overcome by employing a particularly soluble salt, the crystallization temperature of the concentrated solution may be so high that the solution will crystallize when the system is shut down. For example, a solution having a crystallization temperature of 80° F. will not crystallize at the operating temperature, say 130° F. of the system, but after shut down the solution will cool toward ambient temperature which may well be below 80° F.

Further problems arise in selecting a refrigerant composition when the temperature of the heat source for operating the vapor generator is relatively low, as would be the case if the heat source is a stream of solar heated fluid at a temperature of about 200° F. That is, the refrigerant composition must be one which, under the pressure existing in the generator, is capable of boiling at the low temperature of the heat source.

Many absorbent refrigerant compositions have been disclosed in the prior art. U.S. Pat. No. 3,524,815 (Hensel et al) discloses an aqueous lithium bromide/lithium iodide solution which has a sufficiently low crystallization temperature that is suitable for use in an ambient air-cooled system. U.S. Pat. No. 2,802,344 discloses a variety of electrolyte solutions as refrigerant compositions, including alcohol solutions of various inorganic salts.

THIS INVENTION

The present invention contemplates as absorbent-refrigerant composition solutions of any of various salts in mixtures of lower aliphatic alcohols and water, the alcohol and water being miscible.

The sole FIGURE is a schematic illustration of a typical absorption refrigeration system suitable for operating with the refrigerant compositions of the present invention.

It has been found that the solutions of the present invention have properties, particularly vapor pressures and viscosities, which make them suitable as refrigerants in ambient air-cooled systems where generator temperatures are relatively low. The solutions contain the salt in the range 40%–70% by weight, alcohol in the range 10%–50% by weight, and water in the range 10%–50% by weight, based on total weight of solution. In practice the maximum salt concentration will be the concentration at saturation at the lowest temperature experienced by the solution during operation.

The preferred salts are the halides of lithium, calcium, strontium and barium. Other salts may be employed, such as the halides of the other alkali metals, and the chlorates and prechlorates of the alkali metals and of the alkaline earth metals.

The preferred alcohols are methanol, ethanol n-propanol and isopropanol. Other lower aliphatic alcohols may be employed provided that final solution has a boiling point not substantially higher than that of water and is capable of holding a high concentration of the salt in solution.

As an aid in understanding the basis for the invention it is pointed out that solutions of salts in alcohol have been suggested in the prior art for use as refrigerant compositions. These are suitable under some conditions although it has been found that if the salt is highly hygroscopic it may tend to dehydrate the alcohol, thereby forming water and an ether. The presence of the ether adversely affects the operation of the refrigeration system. By having water present initially the dehydration reaction is believed to be suppressed. An additional advantage is that the water-alcohol mixture is capable of dissolving a greater amount of the salt, with the result that the more concentrated solution produces a lower pressure in the absorber section of a refrigeration system. The following table is relevant. The solutions were made up by first making a 62.5% by weight aqueous lithium bromide solution and adding various amounts of methanol.

|  | (1) | (2) | (3) | (4) | (5) |
|---|---|---|---|---|---|
| Methanol, % based on total weight of solution | 27.2 | 21.6 | 19.45 | 17.2 | 14.25 |
| Temperature, ° F. at which the solution has a vapor pressure of 40 mm | 103 | 111 | 116 | 118 | 124 |

Solution (1) contained 45.5% salt and 27.3% water, based on total weight of solution. Solution (5) contained 53.6% salt and 32.2% water, based on total weight of solution.

As the proportion of water in the alcohol-water-salt solution is increased the viscosity of the solution decreases. The following data are relevant:

|  | Solution A | Solution B |
|---|---|---|
| LiBr (anhydrous) | 54.4 % by weight | 42.8 % by weight |
| methanol | 35.6 | 28.6 |
| water | 11.0 | 28.6 |
| viscosity | 28.4 centipoise at 90° F | 6.4 centipoise at 90° F |

The cooling system of the closed refrigeration circuit illustrated in the drawing is a refrigerant evaporator 10, shown in the form of a finned coil, in which the refrigerant liquid (alcohol) vaporized under subatmospheric pressure thereby extracting heat from whatever fluid medium surrounds the coil. The resulting vapor passes into an absorber 14 which is illustrated in the form of a vessel having a tubular heat exchanger core 18 therein. Absorption liquid, for example solution (5) identified above flows from a header 20 into the open upper ends of one set of flow channels in the core 18 and presents a large surface area over which absorption of alcohol vapor takes place. Heat liberated by the absorption process is removed by a stream of ambient cooling air 22 which flows through the other set of core channels.

The resulting dilute salt solution flows downwardly by way of line 26, pump 27, heat exchanger 24 and line 28 into a alcohol vapor generator 30. In the generator 30 the dilute salt solution is heated to boiling temperature bymeans of a heat source such as coil 32 through which solar heated water at approximately 200° F. to 220° F flows, so that refrigerant vapor is expelled from the solution.

Concentrated solution flows from the generator 30 through a line 38 to the heat exchanger 24 where it preheats the dilute salt solution before the latter passes to the generator 30. The cooler concentrated solution then flows upwardly through a line 40 to the header 20 in the absorber 14.

The refrigerant vapor produced in the generator 30 passes through a line 42 to a condenser 44 which is illustrated in the form of a finned tube 45. The vapor flows through the tube 45 and is condensed by giving up heat to a stream of cooling air 22 flowing over the outside of the tube 45. The stream of condensed water flows from the condenser 44 through an orifice 52 to the evaporator 10 where it again vaporizes to effect the desired cooling action of the system.

The system requires that pressure difference be maintained between the high pressure and low pressure parts of the system. More specifically, the orifice 52 helps to maintain a pressure differential between the low pressure in the evaporator 10 and the higher pressure in the condenser 44. The solution pump 27 maintains pressure in the rich-in-refrigerant solution line, while a solution column in line 38 as shown at X or a restrictor maintains pressure in the weak-in-refrigerant solution circuit. Alternatively, a float valve could be provided in the line 38.

The above description of the drawing with the exception of the composition of the absorbent-refrigerant, is applicable to absorbent refrigeration systems generally and has been given in order that the concepts of the present invention may be presented in their proper environment. A more detailed discussion of the operation of the absorber 14 will aid in clarifying the invention. First, it will be appreciated that a low pressure must be maintained in the absorber 14 in order to reduce the pressure in the evaporator 10 to a value at which the liquid refrigerant will vaporize at a satisfactory temperature. The pressure in the absorber 14 is theoretically the vapor pressure of the solution therein at the temperature of the solution. In an air-cooled absorber 14, using ambient air at for example 90° F., the temperature will be relatively high as compared to the temperature which can be obtained with cooling water, and it follows that the vapor pressure of the solution will be relatively high. In order to effect as low a pressure as possible in an air-cooled system it is necessary to employ a highly concentrated salt solution in order to take advantage of the lower vapor pressure of such a solution. The alcohol-water-salt solutions of the present invention are particularly suitable in a ambient air-cooled system, especially one which operates with a heat source at relatively low temperature.

The drawing and the examples are given by way of illustration, and their details are not intended to be limiting except as they appear in the appended claims.

What is claimed is:

1. A liquid absorbent-refrigerant composition for use in an absorption refrigeration system consisting essentially of a solution containing 10%–50% by weight of a lower aliphatic alcohol as refrigerant, said alcohol being miscible with water, 10%–50% by weight water and 40%–70% by weight of a salt selected from the group consisting of the halides of the alkali metals and the alkaline earth metals.

2. A composition as in claim 1 wherein the salt is a halide of lithium, calcium, strontium or barium, and wherein the alcohol is selected from the group consisting of methanol, ethanol, n-propanol and isopropanol.

3. In a method of operating an absorption refrigeration system of the type in which refrigerant vapor is boiled away from a liquid absorbent-refrigerant composition, condensed, evaporated and absorbed in the liquid absorbent remaining after the boiling step the improvement comprising using as the absorbent-refrigerant composition a solution containing 10%–50% by weight of a lower aliphatic alcohol which is miscible with water, 10%–50% by weight water and 40%–70% by weight of a salt selected from the group consisting of the halides of the alkali metals and the alkaline earth metals.

* * * * *